United States Patent

Messina et al.

[15] 3,664,958

[45] May 23, 1972

[54] GREASE COMPOSITIONS

[72] Inventors: Joseph F. Messina, Havertown; Henry Gisser, Philadelphia, both of Pa.

[73] Assignee: The United States of America as represented by the Secretary of the Army

[22] Filed: Sept. 26, 1969

[21] Appl. No.: 861,487

[52] U.S. Cl. .................................................252/54.6, 252/56 S
[51] Int. Cl. ............................................C10m 7/28, C10m 7/24
[58] Field of Search ....................................252/58, 54.6, 56 S

[56] References Cited

UNITED STATES PATENTS 3,258,425   6/1966   Burke ..........................................252/58
3,262,879   7/1966   Messina .......................................252/58

OTHER PUBLICATIONS

" Advanced Lubricants and Lubrication Techniques" by Adamczak et al. in Industrial and Engineering Chemistry, Vol. 56, No. 1, Jan. 1964, pages 40– 46.

*Primary Examiner*—Daniel E. Wyman
*Assistant Examiner*—I. Vaughn
*Attorney*—Harry M. Saragovitz, Edward J. Kelly, Herbert Berl and S. Dubroff

[57] ABSTRACT

Stable grease compositions for use with equipment at extremely low temperatures, the greases consisting of about 68 to 73.8 weight percent trimethylolpropane esters of n-heptoic and n-nonanoic acids in any combination of 10 to 90 weight percent of either, the balance being tetrafluoroethylene polymer having a molecular weight of 10,000–50,000, a softening point of 321.1° C., a particle size less than 30 microns in diameter, and supplied as a 7.5 percent suspension in trichlorotrifluoroethane.

5 Claims, No Drawings

GREASE COMPOSITIONS

The invention described herein may be manufactured, used and licensed by or for the Government for governmental purposes without the payment to us of any royalty thereon.

This invention relates to improved lubricants and more particularly concerns grease compositions which are chemically and physically stable over wide temperature ranges for extended periods.

Current grease-type lubricants are generally inoperable over a wide temperature range, and especially at extremely low temperatures, and are thus not completely suitable for many potential military applications. For example, where lubricants do not possess physical characteristics which will permit their successful and reliable operation on equipment at extremely low temperatures, serious operational problems are introduced which often necessitates the use of auxiliary heaters to raise ambient temperatures. Similarly, extreme pressure properties in grease compositions are usually obtained through the addition of extreme pressure additives which may undesirably affect stability and viscosity properties, among others.

It is therefore an object of the invention to provide improved grease compositions which are substantially free of the abovementioned disadvantages.

Another object of the invention is to provide grease compositions which exhibit excellent low torque characteristics at extremely low temperatures, good anti-wear and extreme pressure properties as well as a low fluid separation and high dropping point.

Other objects and features of the invention will become apparent as the invention is more fully hereinafter disclosed.

Briefly, we have discovered new grease compositions especially useful to the military wherein trimethylolpropane esters of certain fatty acids are thickened with a perfluoro polymer.

More specifically, we have discovered that trimethylolpropane esters of n-heptoic and n-nonanoic acid in any proportion of 10 to 90 weight percent of either may be thickened with tetrafluoroethylene polymer (hereinafter referred to as PTFE) having a molecular weight of about 10,000–50,000 to produce a stable, grease-type lubricant for military applications, among others.

Typical properties of the PTFE solids used in the preparation of our inventive compositions are:

a softening point of 321.1° C.

a particle size under 30 microns in diameter, the PTFE solids being supplied as a 7.5 percent suspension in trichlorotrifluoroethane.

The viscosity of the base fluid, determined at 37.78° C. is 15.1 centistokes, when ⅓ by weight of the ester of n-heptoic and ⅔ by weight of the ester of n-nonanoic acid was used.

The grease was prepared as follows.

The dispersion of PTFE in trichlorotrifluoroethane was heated on a steam bath until 50–75 percent of the solvent evaporated. Approximately 75 percent of the required quantity of a combination of ⅓ by weight of the ester of n-heptoic acid and ⅔ by weight of the ester of n-nonanoic acid was then added, the mixture was stirred and heating continued until all the trichlorotrifluoroethane had evaporated.

The trichlorotrifluoroethane was analyzed by gas chromatography using the following technique. A sample of the grease mixture was eluted using C.P. benzene. The eluted fluid mixture was placed in a gas chromatograph with a 20 feet carbowax 20 M column at 50° C. and a helium gas flow of 10 ml per minute. Absence of a retention peak after 3.3 minutes indicated that all of the trichlorotrifluroethane had evaporated. The remainder of the fluid was then added while stirring, and stirring continued until a homogeneous grease-like product was obtained. The mixture was cooled to room temperature and passed through a colloid mill with stator-to-rotor clearance set at 0.001 in. The homogenized mixture was then placed in a freezer at minus 10° C. for 24 hours, removed and permitted to remain at room temperature an additional 24 hours prior to use. At least two batches of each grease were prepared. The thickener content was determined in duplicate on each batch using a Soxhlet extractor and benzene.

The pour point of the base fluid will be lower than −53.9° C. whether the upper or lower limits of the esters of n-heptoic or n-nonanoic acids are used. The viscosity of the fluid increases slightly as 90 percent of the ester of the n-nonanoic acids are used. The viscosity of the fluid increases slightly as 90 percent of the ester of the n-nonanoic acid is used. All values presented in Tables I through IV were obtained on a mixture of a ⅓ by weight of the ester of n-heptoic acid and ⅔ by weight of the ester of n-nonanoic acid, balance being PTFE thickener, as indicated in Table I below:

TABLE I

Grease Composition

| Base Fluid | | | PTFE Thickener, |
|---|---|---|---|
| Name | wt. % | Pour point | wt. % |
| Trimethylolpropane ester of n-heptoic: n-nonanoic= ⅓ to ⅔ by weight | 73.8 | −53.9° C. | 26.2 |

The PTFE thickener content above represents a minimum concentration necessary to provide a stable grease-like structure. If less than the amount above is used, a semifluid consistency usually results. The effective range of base fluid falls between about 68 to 73.8 weight percent.

Fluid separation was low. The bleeding value in Table II below was corroborated by visual observation on test samples stored in the laboratory from six to twelve months.

TABLE II

Fluid Separation and Dropping Point

| Bleeding, wt. %* | Dropping Point, ° C.** |
|---|---|
| 1.1 | 260.0 |

*Fed. Std. Test Method 321.2 (Fed. Std. Test Method 79lb, 1966), 100° C. for 30 hours.
**ASTM D 2265–67.

Our grease exhibited a high dropping point (temperature at which the first drop of material falls from the cup), a property useful for high temperature applications.

In comparison therewith, prototype grease composition used currently by all military services of the United States Government, other than for chassis lubrication, is a diester mixture base grease including additives and lithium hydroxystearate, MIL–G–23827A, 1 Aug. 1965, yield 5.0 weight percent bleeding and a dropping point of about 163° C., much inferior to our grease composition.

TABLE III

Extreme Pressure Properties

| Seizure load, kg* | Weld load, kg* |
|---|---|
| 100 | 240 |

*Four-Ball Extreme Pressure Tester

The Four-Ball EP Tester determines loads at incipient seizure and at weld. Incipient seizure is defined as the load at which a sudden sizeable increase in wear scar diameter occurs, and weld is the load at which motion of the upper rotating ball in relation to the other three is no longer possible. The data in Table III above show good extreme pressure properties (seizure and weld loads) when compared with MIL–G–23827 A grease, hereinabove referred to, which has a seizure load of 90 kg and a weld load of 190 kg.

It should be borne in mind that no extreme pressure additives are used in our improved grease compositions.

Torque data in Table IV below were obtained using ASTM D 1478-63 slightly modified through the use of a 5-lb weight on the outer race of the 204 ball bearing to eliminate skidding of the balls. The data clearly demonstrate that our grease composition exhibits usually low torques at −53.9° C. or −65° F. This characteristic is vital to our military, since any reductions or elimination of auxiliary equipment required for starting operations is highly desirable.

TABLE IV

Torque (g.-cm.) at −53.9° C.

| Grease | Starting | Running |
|---|---|---|
| Instant Composition | 178 | 127 |
| MIL-G-A | 3825 | 850 |

We wish it to be understood that we do not desire to be limited to the exact details described, for obvious modifications will occur to a person skilled in the art.

WE CLAIM:

1. A homogeneous grease composition comprising a major proportion of a trimethylolpropane ester of a combination of n-heptoic and n-nonanoic acids in any proportion between 10 and 90 weight percent of either of said acids, and a thickening amount of tetrafluoroethylene polymer having a molecular weight between about 10,000 to 50,000 and a particle size less than about 30 microns in diameter.

2. The composition of claim 1 wherein said combination of acids comprise ⅓ by weight n-heptoic acid and ⅔ by weight n-nonanoic acid.

3. The composition of claim 1 wherein said ester has a pour point of less than −65° F.

4. The composition of claim 2 wherein said ester comprises about 68 to 73.8 weight percent of said grease composition, the balance being substantially tetrafluoroethylene polymer having a molecular weight between about 10,000 to 50,000 and a particle size less than about 30 microns in diameter.

5. A homogeneous grease composition exhibiting good low temperature and good extreme pressure properties, a low bleeding point and a high dropping point, consisting essentially of about 73.8 weight percent trimethylolpropane ester of ⅓ by weight n-heptoic acid and ⅔ by weight n-nonanoic acid, said ester having a pour point less than −65° F., and a thickening amount of tetrafluoroethylene polymer having a molecular weight ranging between about 10,000 to 50,000 and a particle size of less than 30 microns in diameter.

* * * * *